United States Patent [19]
Kim et al.

[11] Patent Number: 5,881,109
[45] Date of Patent: Mar. 9, 1999

[54] PULSE SHAPING FILTER FOR π/4-SHIFT QPSK MODULATOR

[75] Inventors: Young Kyun Kim; Choong Il Yeh; Min Taig Kim; Young Ju Jung, all of Taejon, Rep. of Korea

[73] Assignee: Electronics and Telecommunications Research Institute, Taejon, Rep. of Korea

[21] Appl. No.: 825,198

[22] Filed: Mar. 27, 1997

[30] Foreign Application Priority Data

Jun. 28, 1996 [KR] Rep. of Korea ............... 1996 25444

[51] Int. Cl.[6] .................................................. H04L 27/36
[52] U.S. Cl. .......................... 375/298; 375/261; 370/497; 370/535; 370/536; 332/102
[58] Field of Search ..................... 375/295, 298, 375/306, 222, 261, 269; 370/497, 535, 536, 537, 542; 332/103

[56] References Cited

U.S. PATENT DOCUMENTS

| | | | |
|---|---|---|---|
| 4,961,206 | 10/1990 | Tomlinson et al. | 375/261 |
| 5,065,396 | 11/1991 | Castellano et al. | 370/536 |
| 5,361,047 | 11/1994 | Takahara et al. | 332/103 |
| 5,537,405 | 7/1996 | Yoshifuji | 370/536 |
| 5,555,547 | 9/1996 | Lemaitre et al. | 370/536 |

OTHER PUBLICATIONS

Sakata, T., et al., *A New Fully–Digitalized π/4–Shift QPSK Modulator for Personal Communication Terminals*, IEECE Trans. Commun. vol. E77–B, No. 7, Jul. 1994, pp. 921–926.

*Primary Examiner*—Jason Chan
*Assistant Examiner*—Congvan Tran
*Attorney, Agent, or Firm*—Cohen, Pontani, Lieberman & Pavane

[57] ABSTRACT

A pulse shaping filter for the π/4-shift QPSK modulator employed in IS-54 and JDC. The pulse shaping filter includes symbol determining circuits of the I-channel and the Q-channel, demultiplexers for inverse multiplexing each of the input signal value from the symbol determining circuits, a plurality of shift registers for shifting data from each of the demultiplexers according to odd and even symbol clock, a multiplexer for multiplexing each data from the shift registers to produce the corresponding address values, a plurality of ROM tables for storing the multiplexed address value, and a multiplexing and adding unit for multiplexing the address value stored in the ROM tables and adding the resulting multiplexed value.

4 Claims, 3 Drawing Sheets

PULSE SHAPING FILTER FOR π/4-SHIFT QPSK MODULATOR

BACKGROUND OF THE INVENTION

1. Field of the Invention

This invention relates to a pulse shaping filter for π/4-shift QPSK(Quadrature Phase Shift Keying) modulator. In particular, this invention relates to a digital shaping filter for reducing memory required by a pulse shaping filter for the π/4-shift QPSK modulator of the digital mobile communication systems.

2. Description of the Prior Art

It is well-known that the π/4-shift QPSK modulation scheme is a scheme that has combined a conventional QPSK modulation scheme with an Offset QPSK (OQPSK) scheme, and it is mainly used in North America mobile communication system IS-54 and Japan digital cellular system JDC.

Since the conventional π/4-shit QPSK modulation scheme was realized with analog quadrature modulators, distortion and drift were incurred in signal phase, direct-current offset and gain, thus deteriorating the performance of the whole system.

In order to improve that problem, it has been proposed to realize the mobile communication system with digital integrated circuits.

Further, there has been an effort to reduce the cost, size and power consumption of mobile communication terminals in order to realize an economical mobile communication system.

In particular, such digital integrated circuits are suitable for miniaturizing the integrated circuit of a modulator and realizing more stable terminals.

It is assumed that an identical memory look up table scheme is used in all modulators described below.

When a conventional π/4-shift QPSK modulator shaping filter has employed a prescribed memory look up table scheme, the number of address bits is doubled, thereby requiring a large memory of $2^{2N}*S$ words, where N is the number of shift register steps and S is the number of samples per symbol.

As above, a digital shaping filter used in the π/4-shift QPSK modulator of a prescribed memory look up table scheme requires 2 bits per symbol to represent a group of transmission signal points on the orthogonal coordinate system.

Therefore, when a shaping filter is realized by a prescribed memory look up table scheme, the memory required by the conventional π/4-shift QPSK modulator is $2^N$ times as large as that of a general QPSK modulator.

Considering the π/4-shift QPSK modulation scheme, every odd symbol requires 2 bits to represent a symbol, while every even symbol requires only one bit.

FIG. 1 shows the transmission signal points of π/4-shift QPSK modulation scheme.

As shown in FIG. 1, two bits are required to represent the amplitude values of the transmission signal points shown as '⊕', and the amplitude values of the transmission signal points shown as '⊗' can be represented by one bit.

Such scheme is disclosed in a paper in IEICE TRANS. COMMUN. Vol. E77-B, July 1994, p. 921–p. 926, entitled "A New Fully-Digitalized π/4-Shift QPSK Modulator for Personal Communication Terminals" by SAKADA et al. In this scheme, when the number of shift register steps increases, a prescribed memory look up table method is used to reduce the volume of the required memory considerably. In this case, however, still a large memory is required.

Further, the scheme proposed by SAKADA et al. was so improved that it reduces the required memory $2^{3N/2}$ times that of the QPSK modulation scheme, but there is still a problem that the required memory is large for VLSI implementation.

SUMMARY OF THE INVENTION

Therefore, in order to overcome the above problem, the object of the present invention is to provide a pulse shaping filter for π/4-shift QPSK modulator to easily digitalize the modulator by reducing much more memory required for a digital pulse shaping filter than the conventional scheme does.

In order to achieve the above object, the present invention provides a pulse shaping filter for π/4-shift QPSK modulator having a prescribed number of samples per symbol, said filter comprising: symbol determining means for determining one of signal values inputted at each odd and even symbol timing of an I-channel and a Q-channel to output an output control signal corresponding to the determined signal value; inverse multiplexing means for inverse multiplexing the signal value determined by said symbol determining means according to said output control signal; data shifting means for shifting each data from said inverse multiplexing means according to odd and even symbol clocks and outputting the data; multiplexing means for multiplexing said each data from said data shifting means to produce the corresponding address value; data storage means for storing the address value from said multiplexing means; and multiplexing and adding means for multiplexing the address value stored in said data storage means and adding the resulting multiplexed value, wherein an increase in the number of said data shifting means leads to more reduction in memory.

The present invention as above utilizes the characteristics of π/4-shift QPSK modulator and shaping filter, and the symmetry of the shaping filter to realize an efficient pulse shaping filter for π/4-shift QPSK modulator.

That is, the present invention has an advantage that an increase in the number of shift register steps leads to much more reduction in the required memory as compared with prior art.

BRIEF DESCRIPTION OF THE DRAWINGS

The present will be described in detail in conjunction with the accompanying drawings, in which.

DETAILED DESCRIPTION OF THE INVENTION

Figure 1:
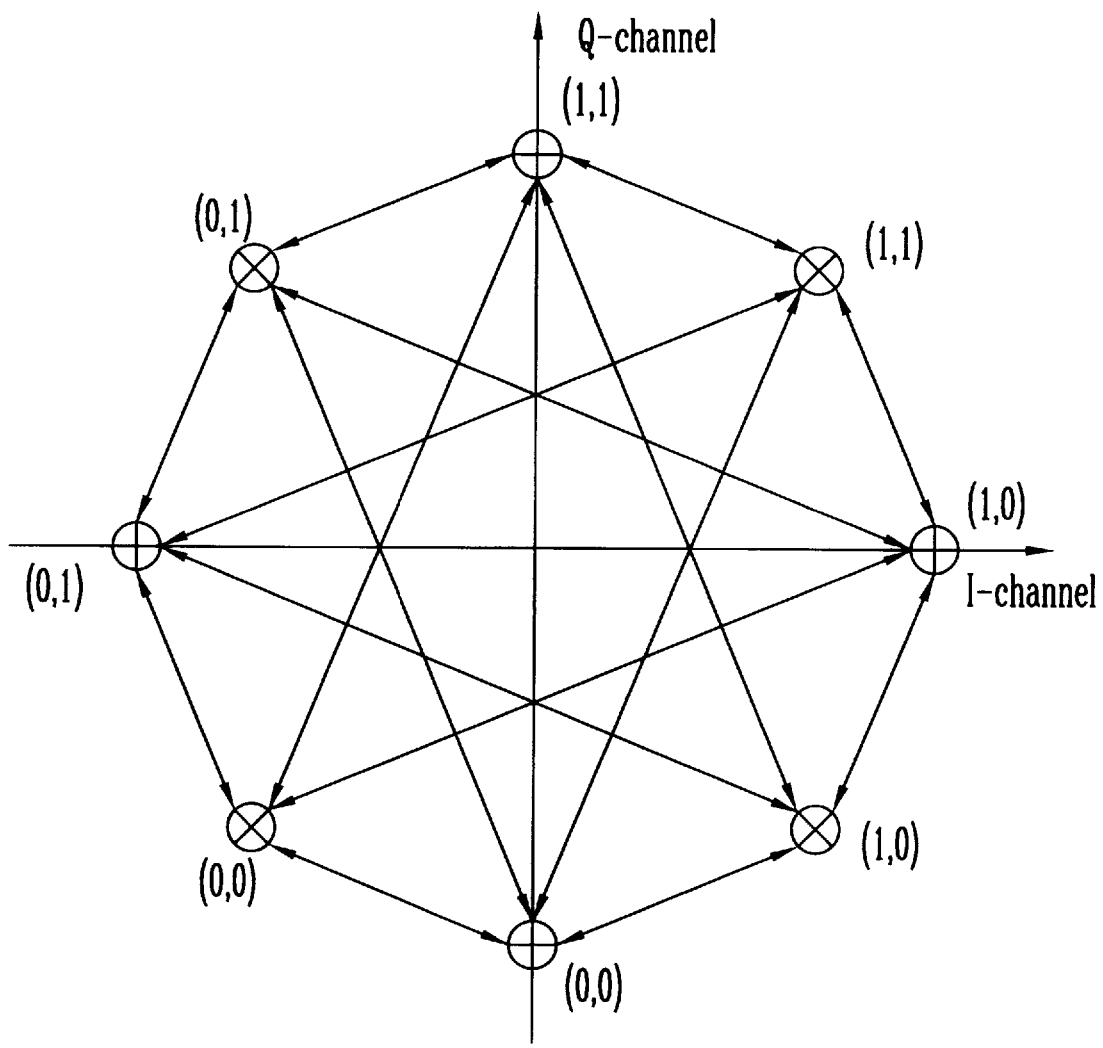
FIG. 1 shows the transmission signal points of π/4-shift QPSK modulation scheme.
Figure 2:
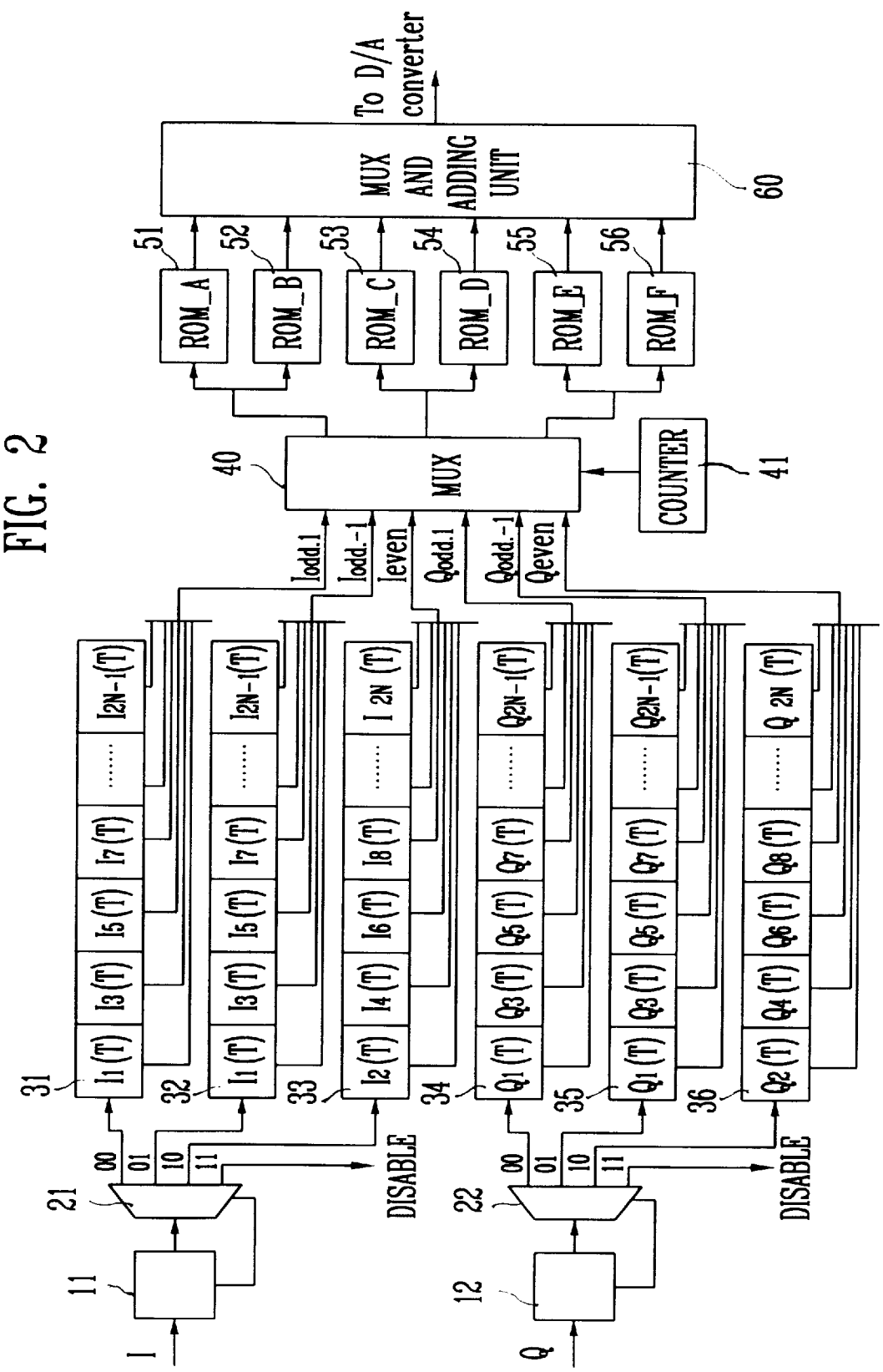
FIG. 2 shows the configuration diagram of a pulse shaping filter for π/4-shift QPSK modulator according to the present invention.

The configuration shown in FIG. 2 comprises a first and second symbol determining units 11 and 12 for determining one of signal values inputted at each odd and even symbol timing of the I-channel and the Q-channel to output an output control signal corresponding to the determined signal value; a first and second demultiplexers 21 and 22 for inverse multiplexing the signal values determined by said first and second symbol determining units 11 and 12 according to said output control signal; a first to sixth shift registers 31–36 for shifting each data from said first and second demultiplexers 21 and 22 according to odd and even symbol clocks and outputting the data; a multiplexer 40 for multiplexing said each data from said shift registers to produce the corresponding address value; a counter 41 for providing clock to produce addresses of ROM tables, i.e. ROM_A, ROM_B, ROM_C, ROM_D, ROM_E and ROM_F, to said multiplexer 40; a first to sixth ROM tables 51–56, i.e. ROM_B, ROM_C, ROM_D, ROM_E and ROM_F for respectively storing the corresponding address value from said multiplexer 40; and multiplexing and adding units 60 for multiplexing the address value stored in said ROM tables 51–56 and adding the resulting multiplexed value, thereby outputting the multiplexed and added value to D/A converter (not shown).

The operation of the apparatus of the present invention will be described below, where the operations of the second symbol determining unit 12, the second demultiplexer 22 and the fourth to sixth shift registers 34–36 are omitted from the description as they are the same as the operations described below.

In FIG. 2, a signal point inputted to the first symbol determining unit 11 is one of three input signal values 1, –1 and 0, and at odd symbol timing, and is one of two input signal values—1√2 and 1√2 at even symbol timing.

In each symbol timing, the first symbol determining unit 11, in response to the input signal value, controls the first demultiplexer 21.

Here, the number of shift register steps is 6 for example and the number of samples per symbol is 4 for example.

During the operation of the apparatus in FIG. 2, when the input signal value is "1" at odd symbol timing, the first symbol determining unit 11 outputs a control signal "00" to control the first demultiplexer 21 through which "1" is inputted to the first shift register 31 and "0" bis inputted to the remaining second and third shift registers 32 and 33.

Also, when the input signal value is "1√2" at even symbol timing, the first symbol determining unit 11 outputs a control signal "10" to control the first demultiplexer 21 through which "1" is inputted to the third shift register 33 and "0" bis inputted to the remaining first and second shift registers 31 and 32.

Such operation is the same for the Q-channel.

Figure 3:
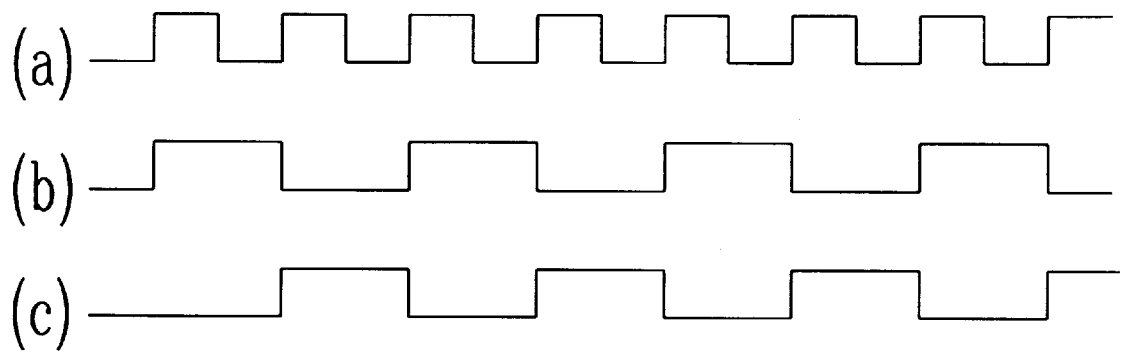
FIG. 3 shows the timing diagram of symbols clocks.

In this case, clocks to each of the shift registers 31–36 are based on a reference symbol clock (see FIG. 3(a)), thereby odd symbol clock (see FIG. 3(b)) is applied to shift registers 31, 32, 34 and 35 and even symbol clock (see FIG. 3(c)) is applied to shift registers 33 and 36.

The outputs from the first to third shift registers 31–33 for the I-channel, i.e. Iodd, 1; Iodd, –1; and Ieven, are multiplexed by the multiplexer 40 and then inputted as address values respectively to the first and second ROM tables 51 and 52, i.e. ROM_A and ROM_B; to the third and fourth ROM tables 53 and 54, i.e. ROM_C and ROM_D; and to the fifth and sixth ROM tables 55 and 56, i.e. ROM_E and ROM_F.

Likewise, the outputs from the fourth to sixth shift registers 34–36 for the Q-channel, i.e. Qodd, 1; Qodd, –1; Qeven, are processed the same in the case of the I-channel.

In this case, the multiplexer 40 is provided with clocks from the counter 40 to produce addresses of the ROM tables.

Then, the multiplexing (MUX and adding unit 60 multiplexes the output values from the ROM tables, adds the resulting multiplexed value and then outputs the resulting added value to D/A converter (not shown).

The total memory in terms of words required by the use of the present invention, with the I-channel and Q-channel multiplexed, is 6*2N/2*4=192 words, where 6 is the number of ROM tables, N is the number of shift register steps and 4 is the number of samples per symbol.

Thus, comparing with the memory of $2^{3N/2}*4=2048$ words required by the prior art of SAKADA et al., the present invention can reduce the required memory about ten times when the number of shift register steps is 6.

An increase in the number of shift register steps leads to much more reduction in the required memory. That is, the effect of memory reduction of the present invention is about 42 times that of the prior art in case of 8 shift register steps, about 170 times in case of 10 shift register steps, and about 682 times in case of 12 shift register steps.

The following table 1 shows the comparison of the required memory between the present invention and prior art.

TABLE 1

| Shift resister step | Number of required word | | Reduction ratio |
| --- | --- | --- | --- |
| | Prior Art | Present Invention | |
| 6 | 2048 | 192 | 0.09375 |
| 8 | 16384 | 384 | 0.02343 |
| 10 | 131072 | 768 | 0.00586 |
| 12 | 1048576 | 1536 | 0.00146 |

Figure 4:
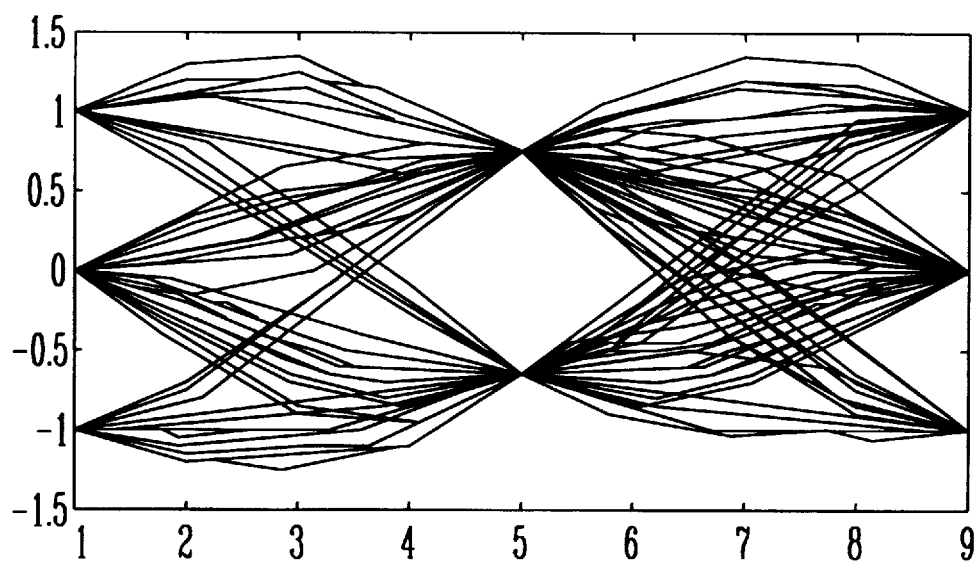
FIG. 4 shows eye patterns, the output signal of a pulse shaping filter for π/4-shift QPSK modulator, wherein the number of shift register steps is 8 and the number of samples per symbol is 4.

For reference, FIG. 4 is provided which shows eye patterns, the output of a pulse shaping filter for π/4-shift QPSK modulator in case of 8 shift register steps and 4 samples per symbol.

What is claimed is:

1. A pulse shaping filter for π/4 shift QPSK modulator having a prescribed number of samples per symbol, said filter comprising:

symbol determining means for determining a signal value inputted at each odd and even symbol timing of an I-channel and a Q-channel to output a unique output control signal corresponding to each different determined signal value;

inverse multiplexing means for inverse multiplexing the input signal value determined by said symbol determining means according to said output control signal for outputting a demultiplexed data signal having a plurality of demultiplex data signal values;

a plurality of data shifting means for shifting each data signal from said inverse multiplexing means according to odd and even symbol clocks and outputting the data, each of said data shifting means being connected to said inverse multiplexing means for receiving a unique one of said demultiplex data signal values from said inverse multiplexing means;

multiplexing means for multiplexing said each data from said data shifting means to produce the corresponding address value;

data storage means for storing the address value from said multiplexing means; and multiplexing and adding mean for multiplexing the address value stored in said data storage means and adding the resulting multiplexed value, wherein an increase in the number of said data shifting means leads to more reduction in memory.

2. A pulse shaping filter of claim 1, wherein said plurality of data shifting means comprises a plurality of shift registers corresponding to the quantity of output data from said inverse multiplexing means in order to reduce memory.

3. A pulse shaping filter of claim 1, wherein said multiplexing means includes a counter for outputting clock pulses to produce addresses of said data storage means.

4. A pulse shaping filter of claim 1, wherein said data storage means comprises a plurality of ROM tables.

* * * * *